(12) United States Patent
Totsuka et al.

(10) Patent No.: US 6,543,332 B1
(45) Date of Patent: Apr. 8, 2003

(54) HYDRAULIC BOOSTER DEVICE

(76) Inventors: Takashi Totsuka, 3-1301, Wakabadai 4-chome, Asahi-ku, Yokohama-shi, Kanagawa, 241-0801 (JP); Tetsuya Masuda, c/o Nabco Yokosuka Plant, 2931, 5-chome, Urago-cho, Yokosuka-shi, Kanagawa, 237-0062 (JP); Kazunori Yamawaki, c/o Nabco Yokosuka Plant, 2931, 5-chome, Urago-cho, Yokosuka-shi, Kanagawa, 237-0062 (JP); Akira Yamada, c/o Nabco Yokosuka Plant, 2931, 5-chome, Urago-cho, Yokosuka-shi, Kanagawa, 237-0062 (JP)

( * ) Notice: Subject to any disclaimer, the term of this patent is extended or adjusted under 35 U.S.C. 154(b) by 0 days.

(21) Appl. No.: 09/591,304

(22) Filed: Apr. 4, 2000

Related U.S. Application Data

(63) Continuation of application No. 09/136,593, filed on Aug. 19, 1998, now Pat. No. 6,053,089.

(30) Foreign Application Priority Data

Aug. 25, 1997 (JP) .............................................. 9-243342

(51) Int. Cl.$^7$ ................................................. F15B 9/10
(52) U.S. Cl. .......................................................... 91/368
(58) Field of Search ........................ 91/368, 422, 369.1, 91/370, 372, 374, 378

(56) References Cited

U.S. PATENT DOCUMENTS

| | | | | |
|---|---|---|---|---|
| 3,747,475 A | * | 7/1973 | Runkle | |
| 3,967,538 A | * | 7/1976 | Thomas | 91/422 X |
| 4,131,055 A | | 12/1978 | Erwin | |
| 4,135,435 A | * | 1/1979 | Adachi | 91/378 X |
| 4,172,411 A | * | 10/1979 | Matsuda et al. | 91/278 |
| 4,294,160 A | * | 10/1981 | Ideta et al. | 91/378 |
| 4,338,855 A | * | 7/1982 | Ideta | 91/387 X |
| 4,598,545 A | * | 7/1986 | Harada | 91/31 X |
| 6,053,089 A | * | 4/2000 | Totsuka et al. | 91/368 |

FOREIGN PATENT DOCUMENTS

| | | | |
|---|---|---|---|
| EP | 0 460 724 A | | 12/1991 |
| JP | 44167/74 | * | 4/1974 |
| JP | 122781/75 | * | 9/1975 |

* cited by examiner

Primary Examiner—Edward K. Look
Assistant Examiner—Thomas E. Lazo

(57) ABSTRACT

In this invention, an idea is adopted in which the pressure at a forward portion and a backward portion of valve device is steppingly dropped twice. The valve device of the present invention includes, on the axis of a spool 600, a first valve 710 located nearer an inlet port and a second valve 720 located nearer an outlet port. A throttling area made by the second valve 720 is larger than a throttling area made by the first valve 710. For example, of all the pressure difference equal to 120 kg/cm$^2$ or more reauired at the forward and backward portions of the valve device, a portion in the range where the problem of an occurrence of a foreign noise is not encountered (for example, a portion ranging from 100 to 120 kg/cm$^2$) is undertaken by the first valve 710, and the remaining portion ranging from 20 to 30 kg/cm$^2$ is undertaken by the second valve 720. By doing so, there can be eliminated such a pressure difference where a generation of a noise before and after an actual throttling (including a primary throttling made by the first valve 710 and a secondary throttling made by the second valve 720) can become a problem.

4 Claims, 2 Drawing Sheets

HYDRAULIC BOOSTER DEVICE

This application is a continuation of U.S. Pat. application Ser. No. 09/136,593, filed Aug. 19, 1998, now U.S. Pat No. 6,053,089 entitled "Hydraulic Booster Device".

BACKGROUND OF THE INVENTION

This invention relates to a hydraulic booster device used in a brake system of vehicles to assist a driver's brake operating force, and more particularly, to an improved technique of the type in which a servo fluid pressure is generated by the effect of a throttle valve provided within the device.

In a hydraulic booster device of this type, a servo fluid pressure is generated by the effect of the throttle valve and therefore, there is no need of a provision of an accumulator or the like, for reserving a pressure-increased fluid pressure within the system including the device. Because of this reason, the device of this type is advantageous in miniaturizing the overall system. Moreover, in the system including the booster device of this type, a working fluid supplied by a pump circulates within the closed system so that it will return to the pump after it flows into the booster device. Owing to such an arrangement, in the system including a booster device of this type, the working fluid flowed out of the booster device is, in many cases, utilized to actuate other devices as represented by a power steering device. By commonly using a single pump in the booster device, in the power steering device and the like, the overall system can be more simplified. For more details, reference should be made, for example, to Japanese Utility Model Unexamined Publication No. Sho 58-35457 or Japanese Patent Examined Publication No. Hei 3-2700.

In a booster device of this type, a main component of valve means for generating the throttling effect is a spool. In response to an input made by a driver, a very tiny clearance is formed between a land portion of an outer periphery of the spool and an inner peripheral wall of a valve bore to which the spool is fitted, the clearance restricts the flow of the working fluid and as a result, a throttling effect occurs. When this throttling effect works, one side of the valve means acting as a throttle valve, i.e., the inlet port side connected to a pump, becomes such high in pressure as exceeding, for example, 120 kg/cm$^2$, whereas the outlet port side communicating with a power steering device, etc., is very low in pressure. It is made clear that due to effect of the large pressure difference between a forward portion and a backward portion of the valve means, a foreign noise tends to occur from the valve means portion especially when the driver keeps operating the booster device (i.e., when the driver keeps depressing the pedal to maintain the valve means in its throttling state). Since such a noise often gives an uncomfortable feel to the driver, it is demanded to prevent an occurrence of such a noise or to reduce such a noise.

In one attempt to prevent an occurrence of a noise from the valve means portion, a pressure difference between a forward portion and a backward portion of the valve means is reduced by varying the effect of a pump or a throttle. However, in this attempt, a servo pressure generated in a servo chamber drops to reduce the servo ratio of the booster device. Accordingly, in order to obtain a predetermined servo ratio, the diameter of the servo piston must be enlarged. This gives rise to another problem in that the requirement for making the booster device small in size cannot be met.

SUMMARY OF THE INVENTION

It is, therefore, an object of the present invention to provide a hydraulic booster device, in which the problem for generating a noise can be prevented without a need of dropping the servo pressure to be generated in a servo chamber.

To achieve this object, an idea is adopted in which the pressure at a forward portion and a backward portion of valve means is steppingly dropped twice. Based on this idea, the valve means of the present invention includes, on the axis of a spool, a first valve located nearer an inlet port and a second valve located nearer an outlet port. A throttling area made by this second valve is larger than a throttling area made by a first valve. For example, of all the pressure difference equal to 120 kg/cm$^2$ or more required at the forward and backward portions of the valve means, a portion in the range where the problem of an occurrence of a foreign noise is not encountered (for example, a portion ranging from 100 to 120 kg/cm$^2$) is undertaker by the first valve, and the remaining portion ranging from 20 to 30 kg/cm$^2$ is undertaken by the second valve. By doing so, there can be eliminated such a pressure difference where a generation of a noise before and after an actual throttling (including a primary throttling made by the first valve and a secondary throttling made by the second valve) can become a problem. Such first and second valves may comprise, on the axis of the spool, a first and a second land portion which are larger in diameter than the adjacent portion and a first and a second inner wall portion of a valve bore adjacent to a first and a second stepped portion which are portions for forming a clearance fitted by the first land portion and the second land portion, respectively.

In order for the first and second valves to have a predetermined throttling effect, a clearance between the land portion and the inner wall portion is controlled. From a view point for achieving an easy machining, it is preferred that the first and second inner wall portions are the same in inside diameter, and the outside diameter of the first land portion is larger than that of the second land portion.

In order to solve the problem of an occurrence of a foreign noise more effectively, an arrangement is preferably established such that in response to an input made by the driver, the second valve generates a throttling effect first and thereafter, the second valve generates a throttling effect. As a specific example, at least one of the first and second valves exhibits a variable throttling effect by varying the shapes of the first and second land portions. Most preferably, when the hydraulic booster device is in a non-operating condition, the distance between the first stepped portion and the first land portion is larger than the second stepped portion and the second land portion. According to this arrangement, the actuation time of the first and second valves can be controlled with a high degree of precision, while utilizing the stroke of the spool.

DETAILED DESCRIPTION OF THE PREFERRED EMBODIMENT

Figure 1:
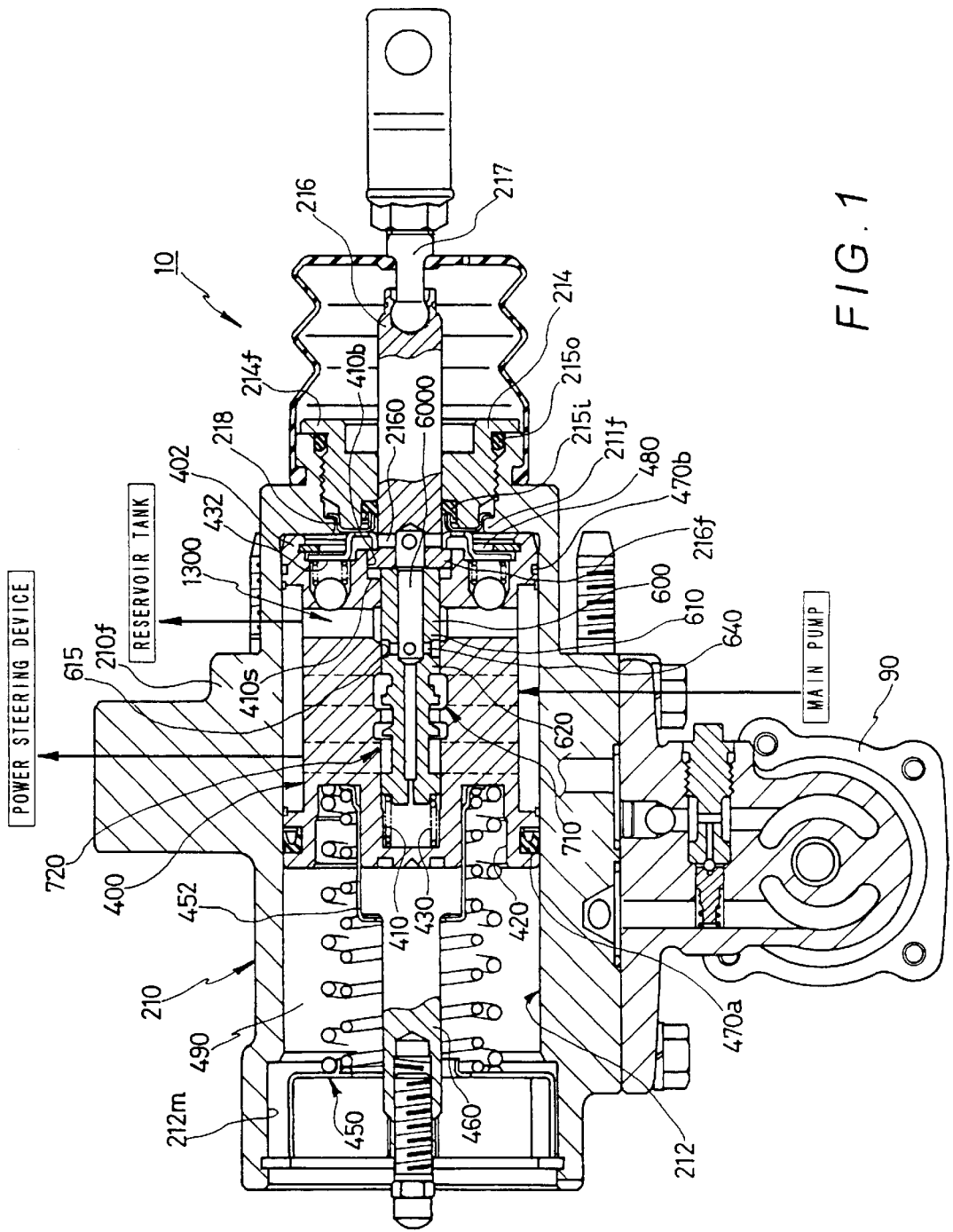
FIG. 1 is a side sectional view of a hydraulic booster device according to one embodiment of the present invention.

FIG. 1 is a side sectional view showing a section taken on the axis of a hydraulic booster device 10 according to one embodiment of the present invention. A housing 210 of the hydraulic booster device 10 includes a cylinder bore 212 extending axially, an inlet port for allowing a working fluid from a pump to flow therein, an outlet port for feeding the working fluid to a power steering device, and a drain port connected to a reservoir tank.

The cylinder bore 212 of the housing 210 extends through the housing 210. A servo piston 400 is movably fitted into the bore 212. That side of the cylinder bore 212 in the axial direction where an attachment flange 210f is located is an input side for receiving an input from a pedal in accordance with a pedal operation of a driver, while the opposite side of the cylinder bore 212 where a somewhat large diameter bore 212m is located is an output side where a master cylinder is disposed. The output side is open to allow the master cylinder to be inserted therein. On the input side, the cylinder bore 212 is closed its opening by a closure member 214. A plunger 216 as an input member extends axially through a central portion of the closure member 214. The plunger 216 is subjected to the force applied to the pedal through a push rod 217. The closure member 214 threadingly engaged with the opening portion of the cylinder bore 212 and integral with the housing 210, retains seal rings 215i, 215o which are disposed inner and outer peripheral sides thereof to close the opening portions. The seal ring 215o located on the outer peripheral side prevents an outwardly-oriented flange 214f of the closure member 214 itself from coming off, while the seal ring 215i located on the inner peripheral side prevents a retainer ring 218 from coming off. The retainer ring 218 fitted to an inner end face of the closure member 214, and such a fitted relation is maintained by the inwardly-oriented flange 211f.

The servo piston 400 in the cylinder bore 212 has such a sectional configuration in match with the inside diameter of the cylinder bore 212. The servo piston 400 extends through the cylinder bore 212 from its input side to its output side. The length of the servo piston 400 is about a half of that of the cylinder bore 212. The servo piston 400 is provided on a central portion thereof with a valve bore 410 extending axially and on an end portion on its output side with a ring type comparatively deep groove 420. The valve bore 410 is closed at its portion on the output side where the groove 420 is formed and open at its side facing the input side. Within the closed valve bore 410, there are arranged, in order from the inner side, a return spring 430, a spool 600 and a flange portion 216f of the plunger 216. The return spring 430 presses one end of the spool 600 towards the input side, so that the other end face of the spool 600 is abutted against an end face of the flange portion 216f of the plunger 216. An opening portion 410b for allowing the flange portion 216f to be inserted therein is larger in diameter than the remaining portion of the valve bore 410. The large-diameter opening portion 410b has a stepped portion 410s on its inner side. The stepped portion 410s restricts an amount of the relative movement between the servo piston 400 and the plunger 216. In this embodiment, a stopper ring 432 adjacent to the retainer ring 218 is in abutment with the flange portion 216f of the plunger 216, thus restricting a retracting position of the plunger 216.

The groove 420 formed in the servo piston 400 is a groove for allowing the entry of a return spring 450 for the servo piston 400 such that one end portion of the spring 450 is retained by a spring retainer 452. That portion of spring retainer 452 which is entered into the groove 420 practically serves as the spring retainer. The remaining portion of the spring retainer 452, which is located outside the groove 420, supports a rod-like output member 460. In a returned condition, i.e., non-operated condition, of FIG. 1, the servo piston 400 is subjected to a biasing force exerted by the return spring 450 such that an one portion (in particular, a ring-type protrusion 402 on an outer periphery of an end portion) on its input side is abutted against an inwardly-oriented flange 211f of the housing 210.

On an outer periphery of the servo piston 400, seal rings 470a, 470b are disposed axis-wise opposite end portions thereof, respectively. Within the cylinder bore 212, a servo chamber 480 is defined on its one side where the closure member 214 is located and an air chamber 490 is defined on its other side where the output member 460 is located. Between the two seal rings 470a and 470b, there are located various passages for communicating the inlet port, the outlet port and the drain port with the valve bore 410 within which the spool 600 is located. The passages include an inlet passage for communicating the inlet port with the valve bore 410, an outlet passage for communicating the outlet port with the valve bore 410, and a drain communication passage 1300 for communicating the drain port with the valve bore 410. Each of the passages includes a groove formed in an outer peripheral portion of the servo piston 400 and a radial bore passage extending radially.

The spool 600 located within the valve bore 410 constitutes, in cooperation with the servo piston 400, a drain port opening/closing valve for creating a communicating state or a non-communicating state between the drain port and the servo chamber 480, a feed valve for creating a non-communicating state or a communicating state between the inlet port and the servo chamber 480, and a throttle valve (valve means as a target problem of this invention) for creating a throttling state or a non-throttling state between the inlet port and the outlet port. A chief component of the drain opening/closing valve is a land portion 610. This land portion 610 is located adjacent to a radial passage 640 formed in the spool 600. In a non-operation initial condition of FIG. 1, the land portion 610 forms a clearance passage 615 between the land portion 610 and an inner periphery side of the servo piston 400. In this embodiment, the servo chamber 480 is in communication with the drain communication passage 1300 via an internal passage 2160 formed in the plunger 216, a central passage 6000 and the radial passage 640 formed in the spool 600, and the clearance passage 615. However, when the spool 600 advances in the non-operating condition of the booster device 10, the clearance passage 615 is shut off to create a non-communicating state between the drain communication passage 1300 side and the servo chamber 480.

The feed valve is located opposite to the drain port opening/closing valve with the radial passage 640 therebetween. A chief component of this feed valve is a land portion 620. The land portion 620 is slightly tapered, for example, by about 1.5 degrees. When the booster device 10 is in the non-operating initial condition of FIG. 1, the feed valve having such land portion 620 creates a non-communication state where the clearance passage between the land portion 620 and the inner periphery side of the servo piston 400 is almost zero. However, when the booster device 10 is in the operating condition, the feed valve creates a communicating state where the clearance passage around the tapered land portion 620 is enlarged. By this, the pressure fluid coming from the inlet port flows into the servo chamber 480 via the feed valve, the radial passage 640 and the central passage 6000 formed in the spool 600, and the internal passage 2160 formed in the plunger 216.

Figure 2:
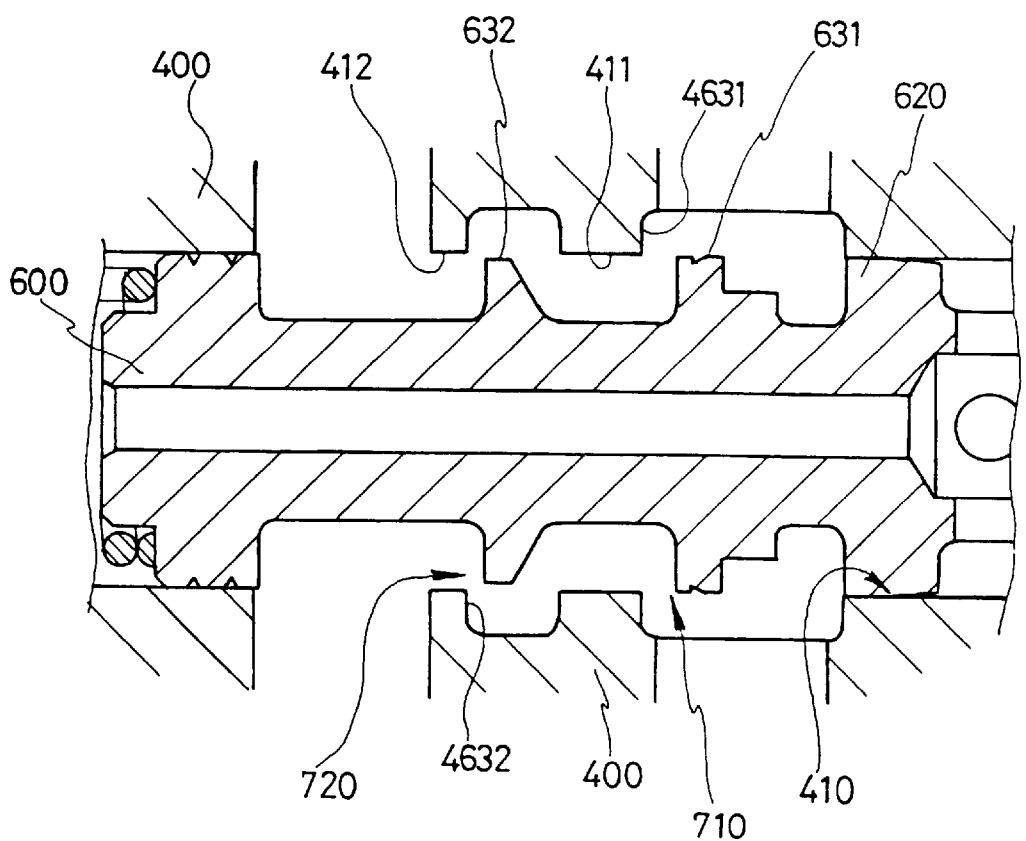
FIG. 2 is an enlarged sectional view showing, on an enlarged scale, an essential portion of the booster device of FIG. 1.

On the other hand, the land portions (first and second land portions 631, 632) constituting a part of the throttle valve are located ahead (i.e., a little to the output side) of the land portions 610, 620 of the drain port opening/closing valve and the feed valve. FIG. 2 is an enlarged sectional view showing the first and second land portions 631, 632. In the present invention, the valve means acting as a throttle valve comprises two separate valves: a first valve 710 and a second valve 720, mutually separately disposed on the axis of the spool 600. The first and second valves 710, 720 include the first and second land portions 631, 632 which are larger in diameter than those portions adjacent thereto on the axis of the spool 600, and a first and a second inner wall portion 411, 412 of the valve bore 410 adjacent to a first and a second stepped portion 4631, 4632, which are those portions for forming a clearance fitted by the land portions 631, 632, respectively. In this embodiment, the inside diameter of the first and second inner wall portions 411, 412 is, for example, 12.72 mm, whereas the outside diameter of the first land portion nearer to the inlet port is 12.55 mm and the outside diameter of the second land portion 632 nearer to the outlet port is 12.50 mm. Accordingly, when the land portions 631, 632 or the spool 600 are brought to the inner peripheries of the respective inner wall portions 411, 412 in accordance with the driver's pedal operation, the first valve 710 near the inlet port acts as a main throttle and the second valve 720 near the outlet port acts as an auxiliary throttle. A pressure difference between a forward portion and a backward portion of the first valve 710 is, for example, about 100 to 120 kg/cm$^2$, whereas a pressure difference between a forward portion and a backward portion of the second valve 720 is, for example, about 20 to 30 kg/cm$^2$. Thus, a pressure difference between a forward portion and a backward portion of the servo piston 400 becomes such a large value as exceeding, for example, 120 kg/cm$^2$ under the effects of the firs and second valves 710, 720. However, since the pressure differences between the forward portions and the backward portions of the first and second valves 710, 720 are smaller than the value for generating a foreign noise, they also serve to prevent a foreign noise from occurring.

It is preferred here that the pressure difference between the forward portion and the backward portion of the first valve 710 acting as a main throttle is more properly restricted to positively prevent the occurrence of a foreign noise. To this end, an arrangement is established such that the second valve 720 acting as an auxiliary throttle generates a throttling effect first and thereafter, the first valve 710 generates a throttling effect. In the illustrated example, when the hydraulic booster device 10 is in its non-operating condition, the distance between the first stepped portion 4631 and the first land portion 631 is larger, for example, by about 0.6 mm, than the distance between the second stepped portion 4632 and the second land portion 632.

It should be noted that although, in the illustrated hydraulic booster device, its own housing 210 is integrally attached with an emergency pump 90 (i.e., a pump for feeding a working fluid in lieu of a main pump located outside the device when the main pump becomes unable to feed a working fluid), the present invention is likewise applicable to those which are not attached with or which do not include the emergency pump 90.

It should also be noted that although, in the illustrated embodiment, two valve portions are provided between the inlet port and the outlet port, three or more valve portions may be provided so that the pressure difference is further steppingly decreased.

What is claimed is:

1. A hydraulic booster device chiefly comprising a housing including a cylinder bore, an inlet port connected to a pump and an outlet port for discharging a working fluid in said cylinder bore; a servo piston movably fitted into said cylinder bore and for defining a servo chamber communicating with said inlet port within said cylinder bore; a valve bore formed in said servo piston and for communicating said inlet port with said outlet port; and a spool movably inserted into said valve bore; and valve means comprising, as a main component, the spool movably inserted into said valve bore, and forming a clearance between a land portion on an outer periphery of said spool and an inner peripheral wall of said valve bore in response to an input made by a driver, thereby throttling a flow of a working fluid flowing towards said outlet port from said inlet port so that a working fluid pressure occurs within said servo chamber, wherein said valve means includes, sequentially in the axial direction of the servo chamber from the inlet port to the outlet port, a first land portion on the spool, a first stepped portion on the inner peripheral wall of said valve bore, a second land portion on the spool, and a second stepped portion on the inner peripheral wall of the valve bore; the first land portion and the first stepped portion forming a first valve, and the second land portion and the second stepped portion forming a second valve; and a throttling area made by said second valve is larger than a throttle area made by said first valve.

2. A hydraulic booster device according to claim 1, wherein said first and second inner wall portions are the same in inside diameter and the outside diameter of said first land portion is larger than that of said second land portion.

3. A hydraulic booster device according to claim 1, wherein, in response to an input made by a driver, said second valve generates a throttling effect first and thereafter, said first valve generates a throttling effect.

4. A hydraulic booster device according to claim 1, wherein when said hydraulic booster device is in a non-operating condition, a distance between said first stepped portion and said first land portion is larger than a distance between said second stepped portion and said second land portion.

* * * * *